No. 714,168. Patented Nov. 25, 1902.
J. E. GAMALIELSON.
CULTIVATOR.
(Application filed Nov. 23, 1901.)
(No Model.)

ATTEST

INVENTOR
Johan Edward Gamalielson
By H. T. Fisher ATTY

UNITED STATES PATENT OFFICE.

JOHAN E. GAMALIELSON, OF KAUMANA, TERRITORY OF HAWAII.

CULTIVATOR.

SPECIFICATION forming part of Letters Patent No. 714,168, dated November 25, 1902.

Application filed November 23, 1901. Serial No. 83,482. (No model.)

*To all whom it may concern:*

Be it known that I, JOHAN EDWARD GAMALIELSON, a citizen of the United States, residing at Kaumana, in the district of Hilo, Territory of Hawaii, have invented certain new and useful Improvements in a Combined Cultivator and Grass and Weed Rake; and I do declare that the following is a full, clear, and exact description of the invention, which will enable others skilled in the art to which it appertains to make and use the same.

Figure 1:
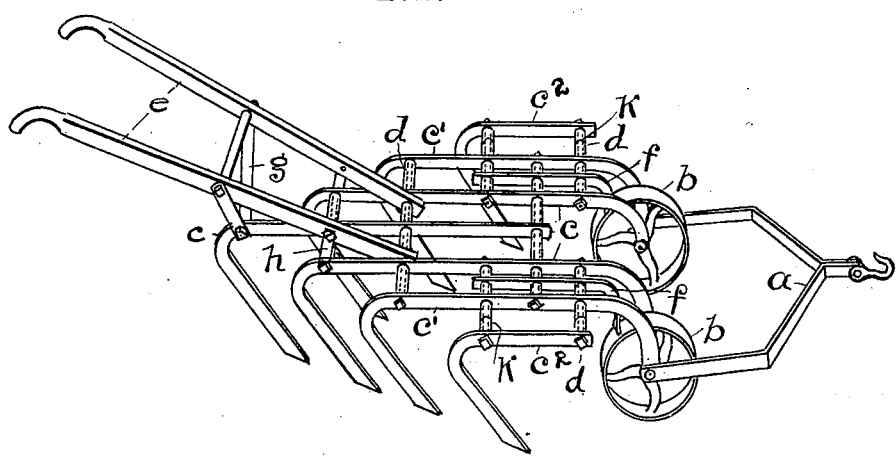
Figure 2:
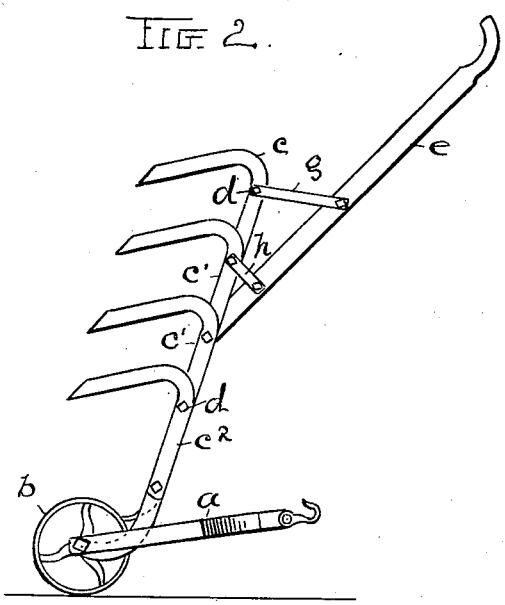

In the accompanying drawings, Figure 1 is a perspective view of my new cultivator, and Fig. 2 is a side elevation thereof as it appears when folded or turned for transportation.

The cultivator as invented, constructed, and used by me and shown by the accompanying drawings has its bars or parts $c$ and $c'$ and $c^2$ made out of suitable steel bars bent downward at the rear end of each part to about an angle of fifty degrees and constructed so as to constitute both the teeth and the framework of the cultivator, and said parts are held together laterally by rods $d$ of three-fourth-inch round steel inserted through pieces of three-fourth-inch pipe about six inches long, forming spacing-sleeves between the beams or bars $c$, $c'$, and $c^2$. Each of said steel bars $c$, $c'$, and $c^2$ is bent edgewise, so as to constitute a tooth for stirring the soil and gathering weeds, as above described. Holes are formed through the steel bars $c$, $c'$, and $c^2$ for the rods $d$, and screw-threads are made on the ends of the rods $d$, whereon nuts are put and screwed up, so as to bring the frame-bars $c$, $c'$, and $c^2$ close up against the ends of the pipe-sections to hold the whole cultivator firmly together.

This cultivator when complete contains eight teeth and covers a space three feet and four inches wide, which answers all ordinary purposes; but, if desired, the number of teeth may be increased in order to cover more ground at one stroke, and the outside tooth-bars $c^2$, as shown by the drawings, are detachable and may be detached when it is desirable to cultivate narrow spaces.

Instead of being made in the ordinary way of cultivators, widest behind and narrowing down to a point in front in the shape of a snow-plow, which has a tendency to throw weeds and grass in among the plants where the cultivator cannot go, but from whence the weeds have to be gathered by hand at great expense, my cultivator is widest in front and narrows to a point behind. This enables me to gather the weeds it gets hold of and to pull up weeds or grasses of a stringy or creeping nature from among the plants.

If there are any weeds in the field that are hard to kill in the ordinary way, this cultivator can be made to run them together into piles, and by bearing or pressing somewhat firmly on handles $e$ this cultivator will carry earth to cover the weeds with, and by repeating the process a few times the weeds can be buried in the ground, where they decompose and add to the fertility of the soil. The "Honchono" grass, so called, is very troublesome to the cane-planters of Hawaii, where the climate is wet, and the killing of this grass had formerly to be done by hand. This is now done by means of this cultivator at less than one-half the former expense. When this cultivator is used to discharge weeds, the operator raises the handles, whereby the weight of the cultivator is thrown on the wheels C, and the cultivator being lifted off the ground drops the weeds behind, while at the same time it rolls them over and leaves the earth on top. When turning at the ends of the rows in the field with this cultivator, it is lifted up behind and thrown forward on the draft-frame $a$ and may be folded, as shown in Fig. 2. Then it turns on a very small space of ground on its wheels. In this folded position it can be transported on its wheels like a cart, which is a great advantage that no one will fail to appreciate that has broken ground or scattered fields to work with, as the old style of cultivators had to be carried either by men or on a cart or sled, and in turning with the old cultivators a large space of vacant ground was required to turn on; otherwise it would break or disturb the plants, which is avoided by this folding cultivator. In stiff, heavy, or wet ground this cultivator works best with the teeth set with the narrow or cutting edge forward; but in light, dry, or sandy soils that may contain numerous grass-roots it works best with the teeth twisted about five or six inches from the points and set broadside forward and the points made like chisel-points, or the teeth may be given only a one-fourth twist and made to turn the soil after the manner of a narrow shovel or moldboard. In bending the steel bars c and c' in bringing the ends of them down to form teeth, they should always be bent edgewise regardless of any twist on the teeth below, as the edge bent elbow is the strongest. There are two scrapers f built into the framework to keep the wheels from clogging.

The draft-frame a is adapted to have the cultivator-frame tilted or turned over upon the same in front of wheels b, so as to rest and carry thereon, and the driver steadies the same by walking alongside and holding it by one hand.

What I claim is—

1. In a combined grass and weed rake and cultivator, a frame comprising a series of metallic bars of different lengths rigidly connected across the entire implement and comprising a central bar and sets of side bars $c$, $c'$ and $c^2$ at each side having their rear ends bent downward and forming teeth, and said bars arranged to form a substantially V shape with the point of the V on the said central bar at the rear, and the said side bars shortening from the center forward at the sides with the shortest bars at the outside, all said bars being spaced apart equally from end to end, rods connecting said bars into one rigid frame and sleeves thereon spacing the bars apart, and a wheel-support centrally at the front of each side section of said frame rigid therewith and a wheel in each wheel-frame, and draft connections and handles, substantially as described.

2. In a combined weed and grass destroyer and cultivator, a series of tooth-bars parallel from end to end their entire length and arranged in substantially V shape with the shorter bars at the front and sides, rods, and sleeves on said rods rigidly connecting the said bars, the two side bars $c$ and $c'$ on each side having their front ends bent downwardly and wheels supported therein, and draft connections from the lower extremities of said bars $c$ $c'$, at the axis of said wheels, substantially as described.

Witness my hand to the foregoing specification this 13th day of September, 1901.

JOHAN E. GAMALIELSON.

Witnesses:
FRED. BREYMAN,
GILLSON BELL.